(12) United States Patent
Yamamoto et al.

(10) Patent No.: US 11,034,405 B2
(45) Date of Patent: Jun. 15, 2021

(54) ABS DISPOSITION STRUCTURE OF SADDLE RIDING VEHICLE

(71) Applicant: HONDA MOTOR CO., LTD., Tokyo (JP)

(72) Inventors: Kanta Yamamoto, Wako (JP); Kunihiro Notsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 16/226,772

(22) Filed: Dec. 20, 2018

(65) Prior Publication Data

US 2019/0202521 A1 Jul. 4, 2019

(30) Foreign Application Priority Data

Dec. 28, 2017 (JP) .............................. JP2017-254244

(51) Int. Cl.
| | |
|---|---|
| *B62K 19/38* | (2006.01) |
| *B62L 3/00* | (2006.01) |
| *B60T 8/36* | (2006.01) |
| *B60T 8/32* | (2006.01) |
| *B60T 8/176* | (2006.01) |

(Continued)

(52) U.S. Cl.
CPC .............. *B62K 19/38* (2013.01); *B60T 8/176* (2013.01); *B60T 8/3225* (2013.01); *B60T 8/3685* (2013.01); *B62K 11/04* (2013.01); *B62K 19/30* (2013.01); *B62L 3/00* (2013.01)

(58) Field of Classification Search
CPC ....... B62K 19/38; B60T 8/176; B60T 8/3225; B60T 8/3685
See application file for complete search history.

(56) References Cited

U.S. PATENT DOCUMENTS

| | | | |
|---|---|---|---|
| 7,942,484 B2 | 5/2011 | Yamakura et al. | |
| 2007/0145227 A1 | 6/2007 | Hasegawa | |

(Continued)

FOREIGN PATENT DOCUMENTS

| | | |
|---|---|---|
| CN | 102481966 | 6/2015 |
| CN | 104890660 | 9/2015 |

(Continued)

OTHER PUBLICATIONS

Chinese Office Action for Chinese Patent Application No. 201811596831.4 dated Mar. 16, 2020.

(Continued)

*Primary Examiner* — Ruth Ilan
*Assistant Examiner* — Myles A Harris
(74) *Attorney, Agent, or Firm* — Amin, Turocy & Watson, LLP (57) ABSTRACT

An ABS disposition structure of a saddle riding vehicle includes a head pipe, a main frame, a pair of left and right center frames extending downward from a rear section of the main frame and having a pivot section by which a front end portion of a swing arm is pivotably supported, a cushion disposed at a center in a vehicle width direction, and an ABS modulator configured to perform ABS control, wherein, when seen in a side view, a central axis of the cushion is disposed to be offset from a center frame in a forward and rearward direction, and the ABS modulator is disposed between the cushion and the center frame in a vehicle width direction.

6 Claims, 11 Drawing Sheets

(51) Int. Cl.
    *B62K 11/04*    (2006.01)
    *B62K 19/30*    (2006.01)

(56) References Cited

U.S. PATENT DOCUMENTS

| | | | |
|---|---|---|---|
| 2008/0079310 A1 | 4/2008 | Yamakura et al. | |
| 2010/0071985 A1* | 3/2010 | Harada | B60T 8/3685 |
| | | | 180/219 |
| 2012/0161417 A1* | 6/2012 | Kawai | B62K 11/04 |
| | | | 280/281.1 |
| 2012/0186895 A1* | 7/2012 | Hamauzu | B62K 11/04 |
| | | | 180/312 |
| 2013/0009378 A1* | 1/2013 | Nagakubo | B60T 8/3685 |
| | | | 280/274 |
| 2015/0329166 A1 | 11/2015 | Tsubone et al. | |

FOREIGN PATENT DOCUMENTS

| | | | | |
|---|---|---|---|---|
| EP | 1531104 A1 * | 5/2005 | ............ | B60T 8/3685 |
| EP | 1679243 | 7/2006 | | |
| EP | 1679243 A1 * | 7/2006 | ............ | B62K 19/30 |
| EP | 1908678 A2 * | 4/2008 | ............ | B62K 19/38 |
| EP | E P-2048051 A2 * | 4/2009 | ............ | B60T 8/3685 |
| EP | 2130731 | 12/2009 | | |
| EP | 2949526 A1 * | 12/2015 | ............ | B60T 17/046 |
| JP | 2011-051417 | 3/2011 | | |
| JP | 2014-065472 | 4/2014 | | |
| JP | 2014-213792 | 11/2014 | | |
| WO | 2014097504 | 6/2014 | | |

OTHER PUBLICATIONS

Extended European Search Report for European Patent Application No. 18213918.8 dated Jun. 11, 2019.

Japanese Office Action for Japanese Patent Application No. 2017-254244 dated Aug. 27, 2019.

* cited by examiner

ABS DISPOSITION STRUCTURE OF SADDLE RIDING VEHICLE

CROSS-REFERENCE TO RELATED APPLICATION

Priority is claimed on Japanese Patent Application No. 2017-254244, filed Dec. 28, 2017, the content of which is incorporated herein by reference.

BACKGROUND OF THE INVENTION

Field of the Invention

The present invention relates to an ABS disposition structure of a saddle riding vehicle.

Description of Related Art

In the related art, in an ABS disposition structure of a saddle riding vehicle, for example, a structure disclosed in International Patent Publication No. 2014/097504 is known. This is a structure in which an ABS unit is disposed at an inner side of a vehicle body frame (inner sides of a pair of left and right pivot frames in a vehicle width direction) along a central axis of a rear suspension. In International Patent Publication No. 2014/097504, a clearance is secured by disposing the rear suspension on an outer side in the vehicle width direction in an offset state, and the ABS unit is disposed between the rear suspension and a pivot frame in the vehicle width direction.

SUMMARY OF THE INVENTION

However, when a rear suspension is disposed at a center in a vehicle width direction, a shape of a vehicle body frame is varied, or the like, it may be difficult to secure a disposition space for an ABS unit.

An aspect of the present invention is directed to disposing an ABS modulator while saving space in an ABS disposition structure of a saddle riding vehicle even when a cushion is disposed at a center in a vehicle width direction.

(1) An ABS disposition structure of a saddle riding vehicle according to an aspect of the present invention includes a head pipe; a main frame extending rearward from the head pipe; a pair of left and right center frames extending downward from a rear section of the main frame and having a pivot section by which a front end portion of a swing arm of the saddle riding vehicle is pivotably supported; a cushion disposed at a center in a vehicle width direction; and an ABS modulator configured to perform ABS control, wherein, when seen in a side view, a central axis of the cushion is disposed to be offset from the center frame in a forward and rearward direction, and the ABS modulator is disposed between the cushion and the center frame in the vehicle width direction.

(2) In the aspect of (1), the ABS modulator may be longer in the forward and rearward direction than in the vehicle width direction.

(3) In the aspect of (1) or (2), when seen in a plan view, the ABS modulator may be disposed outside a seat frame of the saddle riding vehicle in the vehicle width direction.

(4) In the aspect of any one of (1) to (3), the ABS disposition structure of the saddle riding vehicle may further include a stay configured to connect the ABS modulator to a vehicle body frame of the saddle riding vehicle.

(5) In the aspect of (4), the stay may include a cover member configured to cover the ABS modulator from a front, behind and below.

(6) In the aspect of (4) or (5), the stay may include a sub-tank support section configured to support a sub-tank of the saddle riding vehicle.

(7) In the aspect of (6), the sub-tank may be disposed behind the center frame and further inside in the vehicle width direction than an outer end of the center frame in the vehicle width direction.

(8) In the aspect of any one of (1) to (7), the ABS disposition structure of the saddle riding vehicle further includes: a branch section branching off from a rear section of the single main frame toward the pair of left and right center frames; a connecting pipe configured to connect the branch section and the center frame; and a support section on a cushion installed on a rear section of the branch section and configured to support an upper end portion of the cushion, wherein the ABS modulator is disposed below the connecting pipe in between the branch section and the pivot section in the upward and downward direction.

According to the aspect of the above mentioned (1), since the central axis of the cushion is disposed to be offset from the center frame in the forward and rearward direction when seen in a side view, a sufficient space is easily secured between the cushion and the center frame. In addition, since the ABS modulator is disposed between the cushion and the center frame in the vehicle width direction, a space between the cushion and the center frame in the vehicle width direction can be effectively used. Accordingly, the ABS modulator can be disposed while saving space even when the cushion is disposed at a center in the vehicle width direction. In addition, as the central axis of the cushion is disposed to be offset from the center frame in the forward and rearward direction when seen in the side view, since a driving force of the cushion (for example, when swung rearward) acts in a direction in which the disposition space for the ABS modulator expands, this is suitable for disposing the ABS modulator while saving space. In addition, since the ABS modulator is disposed inside the center frame in the vehicle width direction, it is possible to protect the ABS modulator from an impact or the like from an outer side in the vehicle width direction.

According to the aspect of the above mentioned (2), since the ABS modulator is longer in the forward and rearward direction than in the vehicle width direction, in comparison with the case in which the ABS modulator is longer in the vehicle width direction than in the forward and rearward direction, a space between the cushion and the center frame in the vehicle width direction is decreased. Accordingly, it is possible to dispose the ABS modulator using a small limited space.

According to the aspect of the above mentioned (3), since the ABS modulator is disposed outside the seat frame in the vehicle width direction when seen in the plan view, in comparison with the case in which the ABS modulator is disposed inside the seat frame in the vehicle width direction when seen in the plan view, an operator can easily access the ABS modulator from above. Accordingly, a tool path or the like (a working space) of a flare pipe can be secured.

According to the aspect of the above mentioned (4), since the stay configured to connect the ABS modulator to the vehicle body frame is further provided, a supporting rigidity of the ABS modulator can be increased.

According to the aspect of the above mentioned (5), since the stay includes the cover member configured to cover the ABS modulator from the front, behind and below, it is possible to protect the ABS modulator from external factors from the front, behind and below.

According to the aspect of the above mentioned (6), as the stay includes the sub-tank support section configured to support the sub-tank, since the ABS modulator and the sub-tank are supported with a common stay, in comparison with the case in which support members for the sub-tank are individually and independently installed, it is possible to reduce the number of parts and achieve reduction in costs. In addition, it is possible to easily dispose the sub-tank in the vicinity of the ABS modulator.

According to the aspect of the above mentioned (7), as the sub-tank is disposed further inside in the vehicle width direction than the outer end of the center frame in the vehicle width direction at behind the center frame, since the outer end of the center frame in the vehicle width direction becomes a portion that initially comes into contact with the ground surface (a first ground section) upon overturning or the like of the vehicle, it is possible to protect the sub-tank from an impact or the like upon overturning of the vehicle.

According to the aspect of the above mentioned (8), since the branch section branched off from the rear section of the single main frame toward the pair of left and right center frame, the connecting pipe configured to connect the branch section and the center frame, and the support section on a cushion installed on the rear section of the branch section and configured to support the upper end portion of the cushion are further provided, and the ABS modulator is disposed between the branch section and the pivot section in the upward and downward direction and below the connecting pipe, the ABS modulator can be disposed in a mono-backbone frame using a narrowly limited space.

DETAILED DESCRIPTION OF THE INVENTION

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

Figure 1:
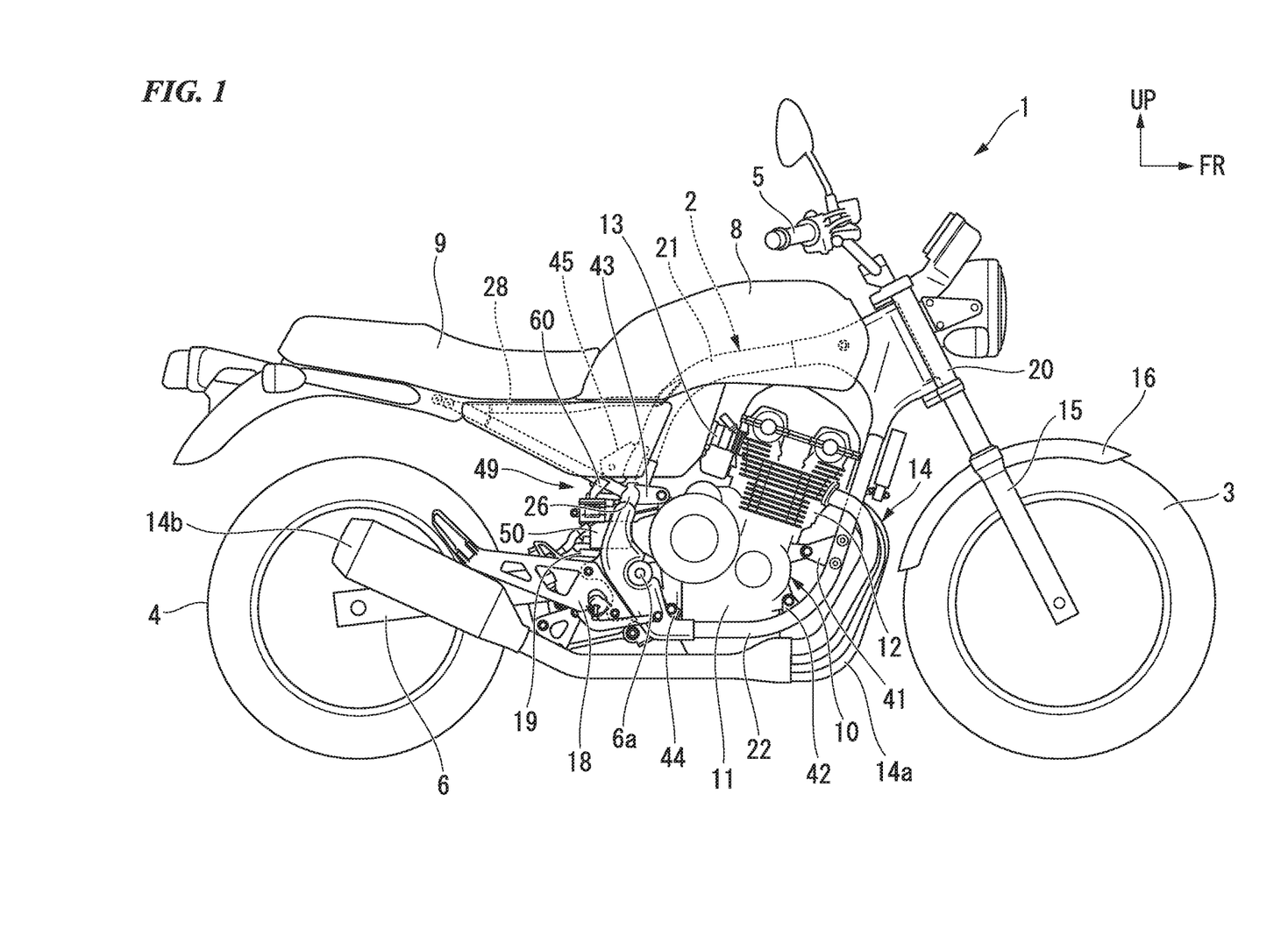
FIG. 1 is a right side view of a motorcycle according to an embodiment of the present invention.

FIG. 1 shows a motorcycle 1 that is an example of a saddle riding vehicle. Referring to FIG. 1, the motorcycle 1 includes a front wheel 3 steered by a handle 5, and a rear wheel 4 driven by a power unit 10 including an engine. Hereinafter, the motorcycle is simply referred to as "a vehicle."

Steering system parts including the handle 5 and the front wheel 3 are steerably supported by a head pipe 20 formed on a front end portion of a vehicle body frame 2. For example, the handle 5 may be a bar handle manufactured by bending a single metal handle pipe having a cylindrical shape. A handle steering shaft connected to the handle 5 is inserted through the head pipe 20. The power unit 10 is disposed at a central portion of the vehicle body frame 2 in a forward and rearward direction. A swing arm 6 is disposed on a side behind the power unit 10. The swing arm 6 is vertically swingably supported by a rear lower section of the vehicle body frame 2 about a pivot shaft 6a. A rear suspension 19 (hereinafter, referred to as "a cushion 19") is interposed between a front section of the swing arm 6 and a rear section of the vehicle body frame 2.

For example, the vehicle body frame 2 is formed by integrally coupling steel members of a plurality of types through welding or the like. In the embodiment, the vehicle body frame 2 is a so-called mono-backbone double-cradle frame in which an engine is hung on a single main frame 21 and two down tubes 22 are disposed from the front to the bottom of the engine. Hereinafter, in the vehicle, "L" denotes components disposed on a left side in a vehicle width direction, and "R" denotes components disposed on a right side in the vehicle width direction.

Figure 2:
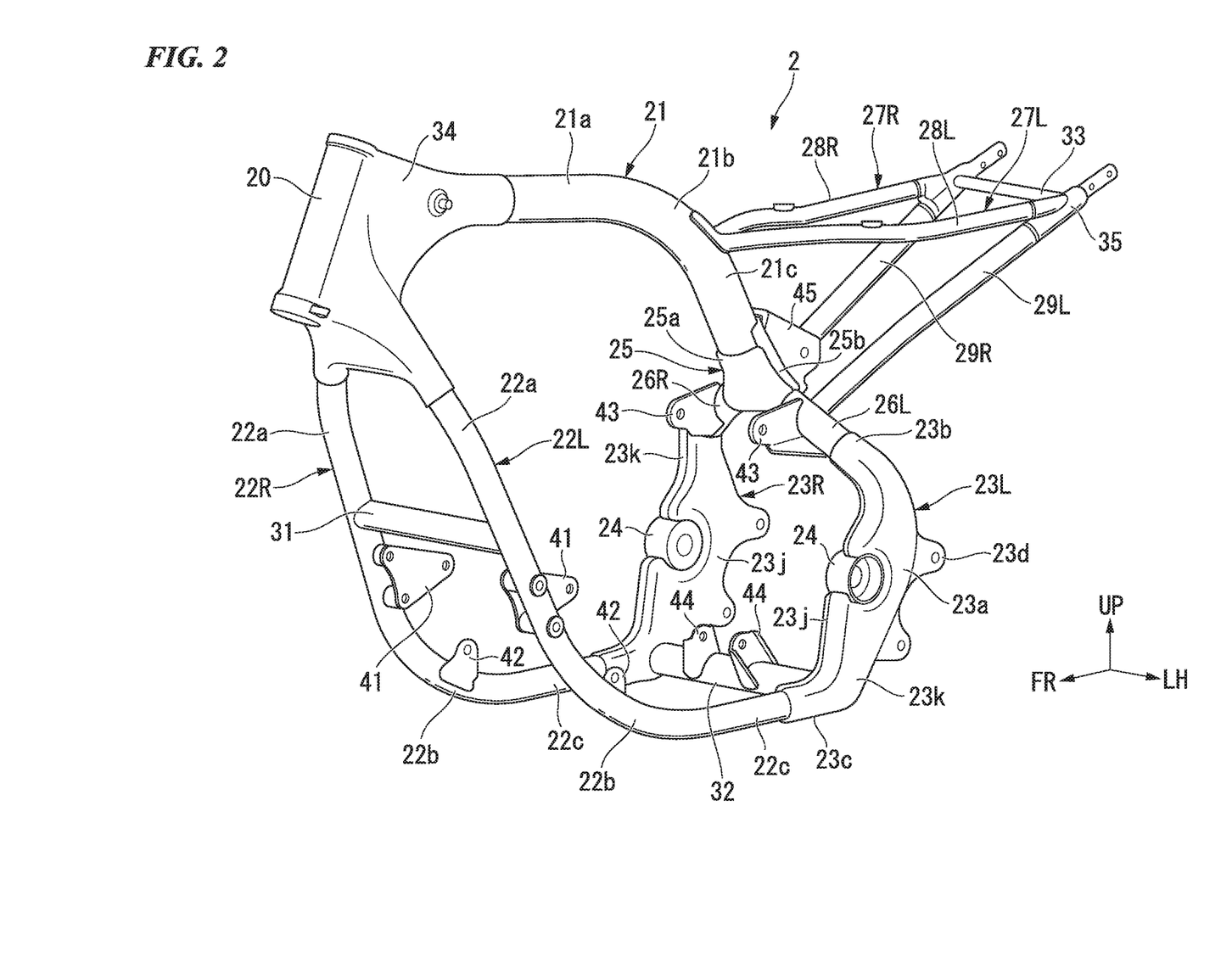
FIG. 2 is a perspective view of a vehicle body frame of the motorcycle.

As shown in FIG. 2, the vehicle body frame 2 includes the head pipe 20 disposed at a front end thereof, the single main frame 21 extending to be curved downward after extending rearward and downward from an upper section of the head pipe 20, a pair of left and right down tubes 22L and 22R extending to be curved rearward after extending rearward and downward from a lower section of the head pipe 20 more steeply than the main frame 21, a pair of left and right center frames 23L and 23R extending downward from a rear section of the main frame 21 and on which pivot sections 24 (a shaft support section of the pivot shaft 6a) by which a front end portion of the swing arm 6 (see FIG. 1) is pivotably supported are installed, a branch section 25 branched off from the rear section of the main frame 21 toward the left and right center frames 23L and 23R, a pair of left and right connecting pipes 26L and 26R configured to connect the branch section 25 and the center frames 23, a pair of left and right seat frames 27L and 27R extending rearward and upward from a rear upper end portion of the main frame 21, a front cross member 31 extending in the vehicle width direction to connect front sections of the left and right down tubes 22L and 22R, a lower cross member 32 extending in the vehicle width direction to connect lower sections of the left and right center frames 23L and 23R, and a rear cross member 33 extending in the vehicle width direction to connect rear sections of the left and right seat frames 27L and 27R.

As shown in FIG. 1, the power unit 10 includes a crank case 11, and a cylinder 12 protruding forward and upward from a front section of the crank case 11.

A front upper section of the crank case 11 is attached to front sections of the left and right down tubes 22 via first engine hangers 41. A front lower section of the crank case 11 is attached to curved sections (front lower curved sections 22b, see FIG. 3) of the left and right down tubes 22 via second engine hangers 42. A rear upper section of the crank case 11 is attached to the left and right connecting pipes 26 via third engine hangers 43. A rear lower section of the crank case 11 is attached to the lower cross member 32 (see FIG. 3) via a fourth engine hanger 44.

An intake apparatus 13 and an exhaust apparatus 14 are connected to the cylinder 12. For example, the intake apparatus 13 includes a throttle body connected to a rear wall of the cylinder 12 and communicating with an intake port to adjust an intake amount, and an air cleaner configured to purify air taken into to the throttle body and perform air intake for the power unit 10 (which are not shown).

The exhaust apparatus 14 includes an exhaust pipe 14a which is connected to a front wall of the cylinder 12, which is in communication with the exhaust port, which is extending rearward and downward in the front of the power unit 10, and which is bend to extend forward and rearward below the power unit 10, and a muffler 14b connected to a rear end of the exhaust pipe 14a and extending toward a diagonal rear upper side on a right side of the rear wheel 4.

A fuel tank 8 is attached to the main frame 21. A seat 9 extending forward and rearward along seat rails 28 is installed behind the fuel tank 8 and above the seat rails 28.

Further, in FIG. 1, reference numeral 15 designates a pair of left and right front forks disposed on left and right sides of the front wheel 3, and reference numeral 16 designates a front fender configured to cover the front wheel 3 from above.

<Details of Vehicle Body Frame>

Figure 3:
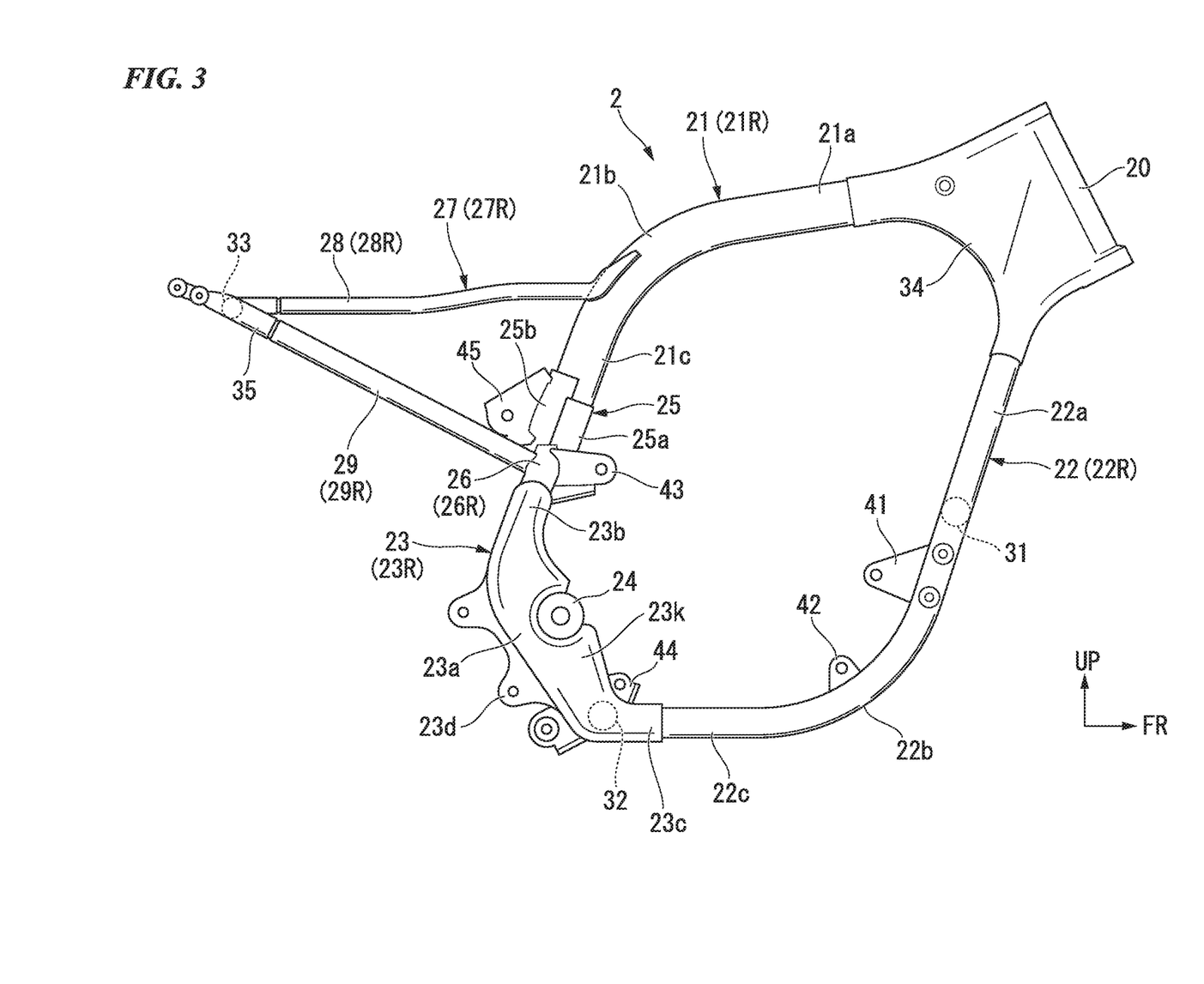
FIG. 3 is a right side view of the vehicle body frame.

When seen in a side view of FIG. 3, the vehicle body frame 2 includes the cylindrical head pipe 20 inclined to be disposed downward as it goes forward and extending upward and downward, the single main frame 21 extending rearward and downward from the head pipe 20 and then extending to be curved downward, the pair of left and right down tubes 22 extending rearward and downward from the head pipe 20 more steeply than the main frame 21 and then curved rearward, the pair of left and right center frames 23 extending downward from the rear section of the main frame 21 and having the pivot sections 24 by which a front end portion of the swing arm 6 (see FIG. 1) is pivotably supported, the branch section 25 branched off from the rear section of the main frame 21 toward the left and right center frames 23, the pair of left and right connecting pipes 26 configured to connect the branch section 25 and the center frames 23, the pair of left and right seat frames 27 extending rearward and upward from a rear upper end portion of the main frame 21, the front cross member 31 extending in a vehicle width direction to connect front sections of the left and right down tubes 22, the lower cross member 32 extending in the vehicle width direction to connect lower sections of the left and right center frames 23, the rear cross member 33 extending in the vehicle width direction to connect rear sections of the left and right seat frames 27, a front gusset 34 connected to a front section of the main frame 21, front sections of the left and right down tubes 22 and the head pipe 20, and a rear gusset 35 connected to rear sections of the left and right seat frames 27 and the rear cross member 33.

For example, in the components of the vehicle body frame 2, the head pipe 20, the main frame 21, the down tubes 22, the connecting pipes 26, the seat frames 27 and the cross members 31 to 33 are constituted by round steel tubes. The head pipe 20 and the main frame 21 are constituted by round steel tubes having substantially the same diameter. The main frame 21 is constituted by a round steel tube having a diameter slightly larger than that of the down tubes 22. The down tubes 22, the connecting pipes 26, the front cross member 31 and the lower cross member 32 are constituted by round steel tubes having substantially the same diameter. The seat frames 27 and the rear cross member 33 are constituted by round steel tubes having a diameter slightly smaller than that of the down tubes 22.

<Main Frame>

When seen in a side view of FIG. 3, the main frame 21 includes a main frame front half section 21a extending from the upper section of the head pipe 20 to be gently inclined rearward and downward, a rear upper curved section 21b connected to a rear end of the main frame front half section 21a to form a curved shape protruding rearward and upward, and a main frame rear half section 21c connected to a rear end of the rear upper curved section 21b and extending to be inclined more steeply than the main frame front half section 21a. The main frame front half section 21a, the rear upper curved section 21b and the main frame rear half section 21c are constituted by an integrated round steel tube.

Figure 4:
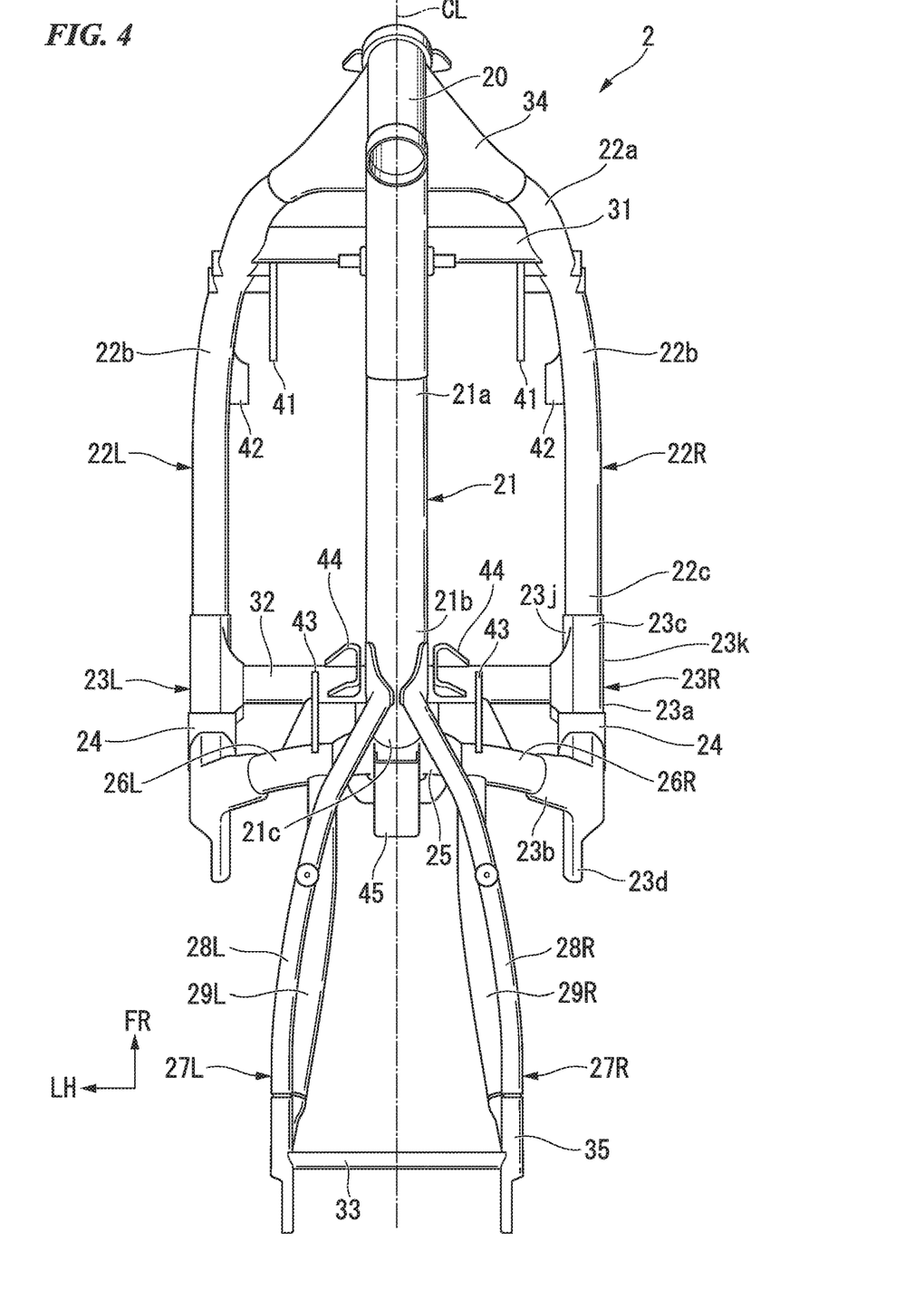
FIG. 4 is a plan view of the vehicle body frame.

When seen in a plan view of FIG. 4, the main frame 21 extends linearly forward and rearward along the vehicle body longitudinal centerline CL.

<Down Tube>

When seen in a side view of FIG. 3, the down tubes 22 includes a down tube front half section 22a extending from a lower section of a connecting section of the main frame 21 in the head pipe 20 to be inclined more steeply than the main frame front half section 21a, the front lower curved sections 22b connected to the rear end of the down tube front half sections 22a to form a curved shape protruding forward and downward, and a down tube rear half section 22c connected to rear ends of the front lower curved sections 22b and extending rearward. The down tube front half sections 22a, the front lower curved sections 22b and the down tube rear half section 22c are constituted by an integrated round steel tube.

When seen in a plan view of FIG. 4, the left and right down tubes 22L and 22R extend to be inclined to be disposed outward in the vehicle width direction as they go rearward from the head pipe 20, bend at the front lower curved sections 22b, and extend rearward to be substantially parallel to side surfaces of the vehicle body.

Figure 5:
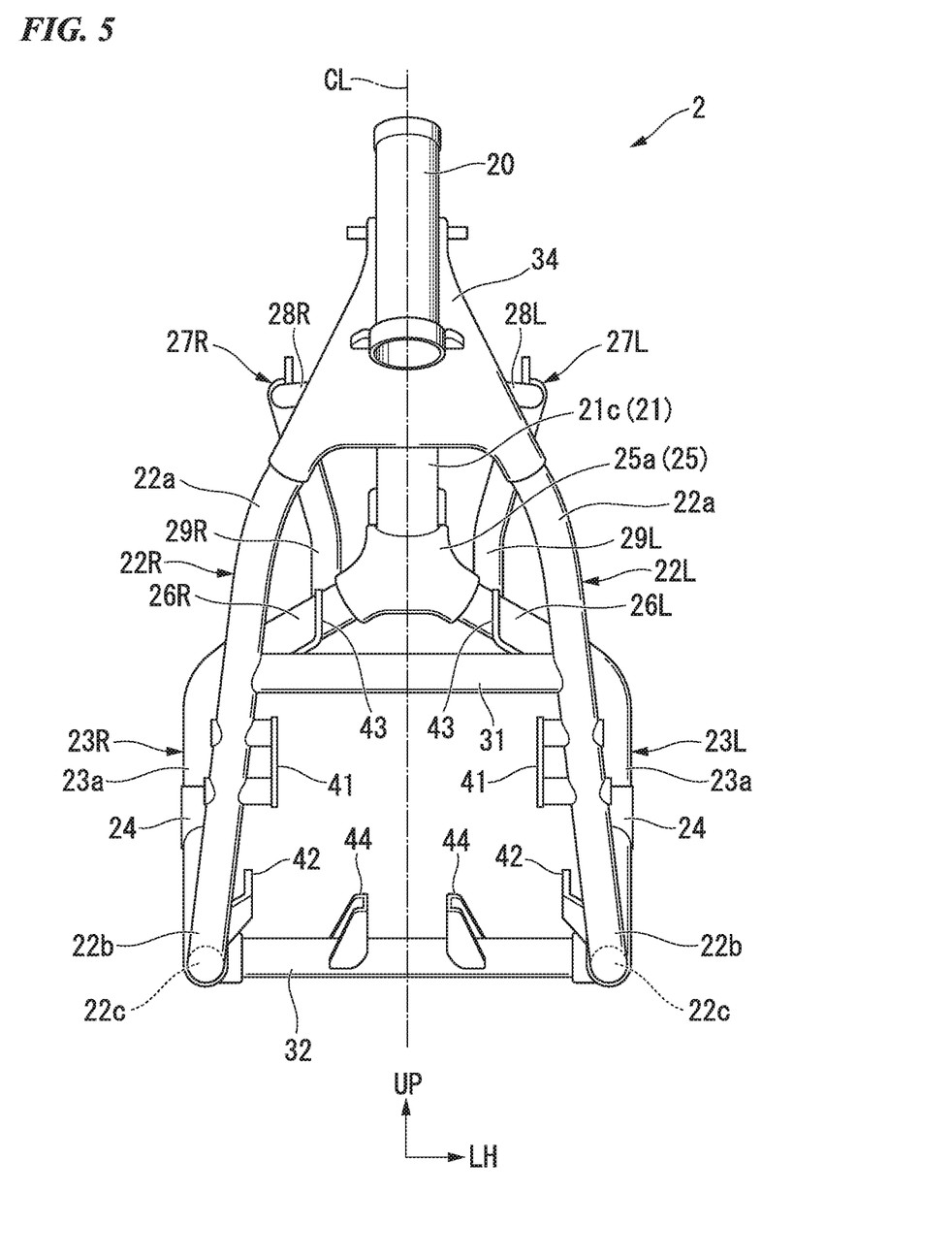
FIG. 5 is a front view of the vehicle body frame.

When seen in a front view of FIG. 5, the left and right down tubes 22L and 22R are disposed further inside in the vehicle width direction than outer surfaces of the left and right center frames 23L and 23R in the vehicle width direction. When seen in the front view of FIG. 5, the front cross member 31 crossing the left and right down tube front half sections 22a in the vehicle width direction is installed between lower sections of the left and right down tube front half sections 22a. The front cross member 31 extends linearly in the vehicle width direction. For example, the front cross member 31 is coupled to the left and right down tube front half sections 22a through welding.

As shown in FIG. 2, the first engine hangers 41 protruding rearward are formed on lower end portions of the left and right down tube front half sections 22a. The first engine hangers 41 are formed on a lower region of a connecting section of the front cross member 31 in the left and right down tube front half sections 22a. For example, the first engine hangers 41 are coupled to the down tube front half sections 22a by fastening bolts.

The second engine hangers 42 are formed to protrude upward from the front lower curved sections 22b of the left and right down tubes 22. For example, the second engine hangers 42 are coupled to the front lower curved sections 22b through welding.

<Center Frame>

When seen in the side view of FIG. 3, the center frames 23 include center frame main bodies 23a extending to be inclined to be disposed downward as they go forward and having the pivot sections 24 formed in concave sections of front upper sections thereof, upper connecting sections 23b extending forward and upward from upper ends of the center frame main bodies 23a and connected to the connecting pipes 26, lower connecting sections 23c extending forward from lower ends of the center frame main bodies 23a and connected to the down tubes 22, and bracket connecting sections 23d protruding rearward and downward from rear ends of the center frame main bodies 23a and connected to a step bracket 18 (see FIG. 1). The center frame main bodies 23a, the upper connecting section 23b, the lower connecting sections 23c and the bracket connecting sections 23d are integrally formed of the same member.

As shown in FIG. 2, the center frames 23 include inner half bodies 23j disposed inside in the vehicle width direction, and outer half bodies 23k disposed outside in the vehicle width direction. For example, the inner half bodies 23j and the outer half bodies 23k are coupled integrally with each other through welding.

Figure 8:
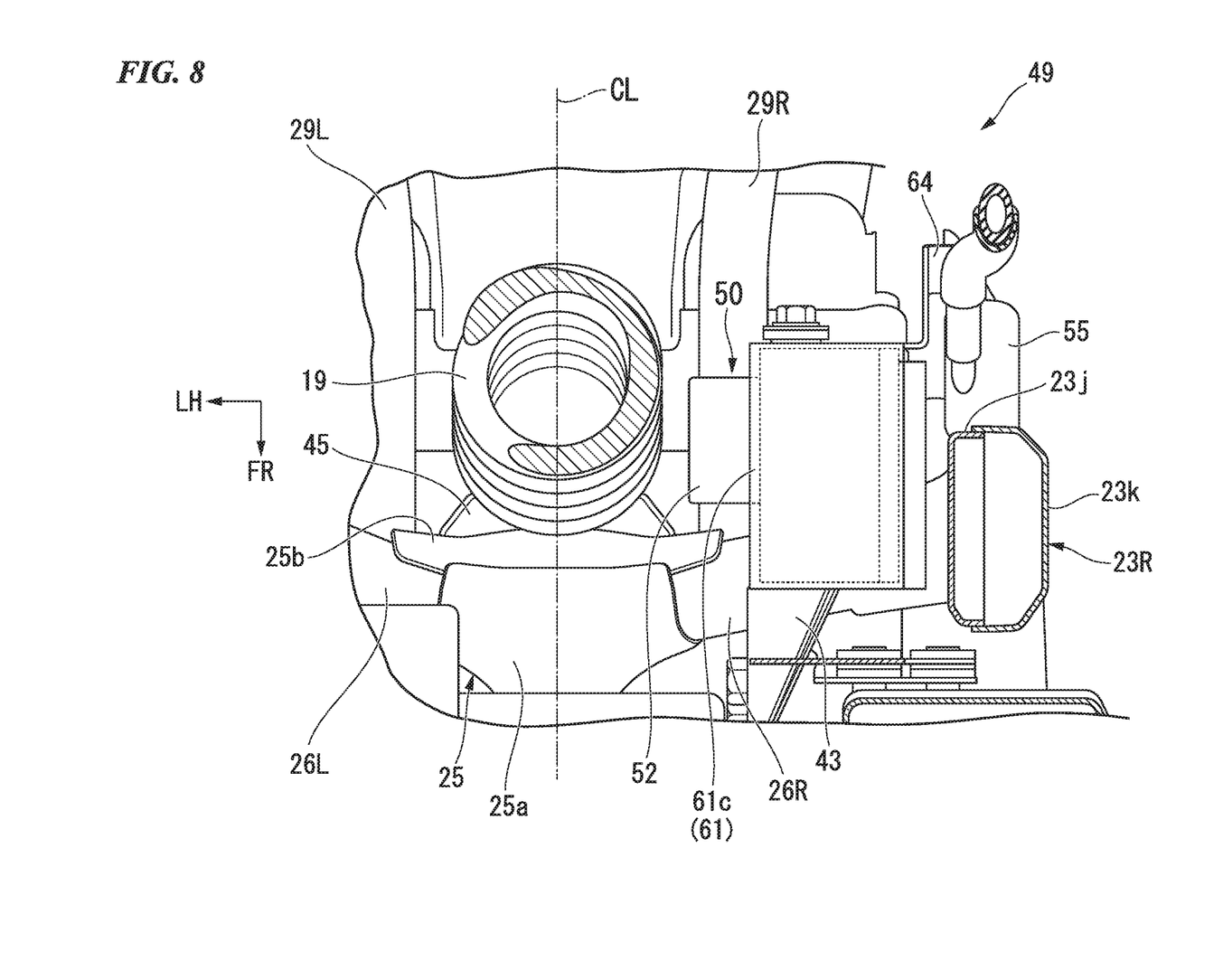
FIG. 8 is a bottom view including a cross section taken along line VIII-VIII in FIG. 6.

The outer half bodies 23k are coupled to the inner half bodies 23j from outside in the vehicle width direction. The left and right center frames 23 have a closed annular shape having a long side in a forward and rearward direction when seen in a cross-sectional view of FIG. 8 by coupling the inner half bodies 23j and the outer half bodies 23k. That is, the left and right center frames 23 form a hollow member having a closed cross-sectional structure.

When seen in the front view of FIG. 5, outer surfaces of the left and right center frame main bodies 23a in the vehicle width direction form an outer end surface of the vehicle body frame 2 in the vehicle width direction.

When seen in the plan view of FIG. 4, the pair of left and right upper connecting sections 23b are curved from the upper ends of the center frame main bodies 23a toward an inner side in the vehicle width direction along the inclinations of the connecting pipes 26.

When seen in the front view of FIG. 5, the lower cross member 32 crossing the left and right center frame main bodies 23a in the vehicle width direction is installed between lower end portions of the left and right center frame main bodies 23a. The lower cross member 32 forms a linear shape in the vehicle width direction. For example, the lower cross member 32 is coupled to the left and right center frame main bodies 23a through welding.

The pair of left and right fourth engine hangers 44 are installed on the lower cross member 32 to stand forward and upward. For example, the fourth engine hangers 44 are coupled to the lower cross member 32 through welding.

<Branch Section>

When seen in the front view of FIG. 5, the branch section 25 has a three-forked shape branched off upward, toward a left side in the vehicle width direction and toward a right side in the vehicle width direction. The branch section 25 connects a lower end portion of the main frame rear half section 21c and inner end portions of the left and right connecting pipes 26L and 26R in the vehicle width direction. As shown in FIG. 2, the branch section 25 includes a branch front half section 25a configured to cover a coupling section (hereinafter, referred to as "a three-point coupling section") between the lower end portion of the main frame rear half section 21c and the inner end portions of the left and right connecting pipes 26 in the vehicle width direction from a front lower side, and a branch rear half section 25b configured to cover the three-point coupling section from a rear upper side. For example, the branch front half section 25a and the branch rear half section 25b are coupled integrally with each other through welding.

A support section 45 on the cushion configured to support an upper end portion of the cushion 19 (see FIG. 1) is installed on a rear section of the branch section 25. When seen in the side view of FIG. 3, the support section 45 on the cushion protrudes rearward. When seen in the side view of FIG. 3, the support section 45 on the cushion is disposed between the top and bottom of the seat rails 28 and support pipes 29. For example, the support section 45 on the cushion is coupled to the branch rear half section 25b through welding.

<Connecting Pipe>

When seen in the front view of FIG. 5, the left and right connecting pipes 26L and 26R extend linearly from an outer end of the branch section 25 in the vehicle width direction to be disposed downward as they go outward in the vehicle width direction.

As shown in FIG. 2, the third engine hangers 43 are installed on the left and right connecting pipes 26L and 26R to protrude forward. For example, the third engine hangers 43 are coupled to the left and right connecting pipes 26L and 26R through welding.

<Seat Frame>

When seen in the side view of FIG. 3, the left and right seat frames 27 include the seat rails 28 extending rearward from the rear upper curved section 21b of the main frame 21, and the support pipes 29 extending from the connecting pipes 26 to be inclined rearward and upward.

When seen in the plan view of FIG. 4, the left and right seat rails 28L and 28R extend to be inclined to be disposed outward in the vehicle width direction as they go rearward from the rear upper curved section 21b of the main frame 21, and then, extend to be curved rearward.

When seen in the plan view of FIG. 4, the left and right support pipes 29L and 29R extend linearly rearward from the connecting pipes 26, and then, extend to be inclined to be disposed outward in the vehicle width direction as they go rearward. The rear end portions of the left and right support pipes 29L and 29R are coupled to the rear end portions of the left and right seat rails 28L and 28R, respectively.

When seen in the plan view of FIG. 4, the rear cross member 33 crossing the left and right seat frames 27L and 27R in the vehicle width direction is installed between the rear end portions of the left and right seat frames 27L and 27R. The rear cross member 33 forms a linear shape in the vehicle width direction. For example, the rear cross member 33 is coupled to the left and right seat frames 27L and 27R through welding.

<ABS Disposition Structure>

As shown in FIG. 1, an ABS disposition structure 49 is installed on a central section of the vehicle in the forward and rearward direction. Referring also to FIG. 2, the ABS disposition structure 49 includes the head pipe 20, the main frame 21 extending rearward from the head pipe 20, the pair of left and right center frames 23 extending rearward from the rear section of the main frame 21 and having the pivot section 24 by which the front end portion of the swing arm 6 is pivotably supported, the branch section 25 branched off from the rear section of the single main frame 21 toward the pair of left and right center frames 23, the connecting pipes 26 configured to connect the branch section 25 and the center frames 23, the cushion 19 disposed at a center in the vehicle width direction, the support section 45 on the cushion installed on the rear section of the branch section 25 and configured to support the upper end portion of the cushion 19, an ABS modulator 50 configured to perform ABS control, and a stay 60 configured to connect the ABS modulator 50 to the vehicle body frame 2.

When seen in the side view of FIG. 6, a central axis C1 (hereinafter, referred to as "a cushion axis C1") of the cushion 19 is disposed to be offset from the center frames 23 in the forward and rearward direction. In the embodiment, the cushion axis C1 is disposed to offset toward a rear side of the center frames 23. When seen in the side view of FIG. 6, the cushion axis C1 is disposed at a position that does not overlap the center frame main bodies 23a. That is, when seen in the side view of FIG. 6, the cushion axis C1 is disposed to avoid the center frame main bodies 23a. When seen in the side view of FIG. 6, the cushion axis C1 extends upward and downward to be slightly inclined forward with respect to a vertical line. When seen in a front view of FIG. 9, the cushion axis C1 is disposed at a position that overlaps the vehicle body longitudinal centerline CL.

Figure 6:
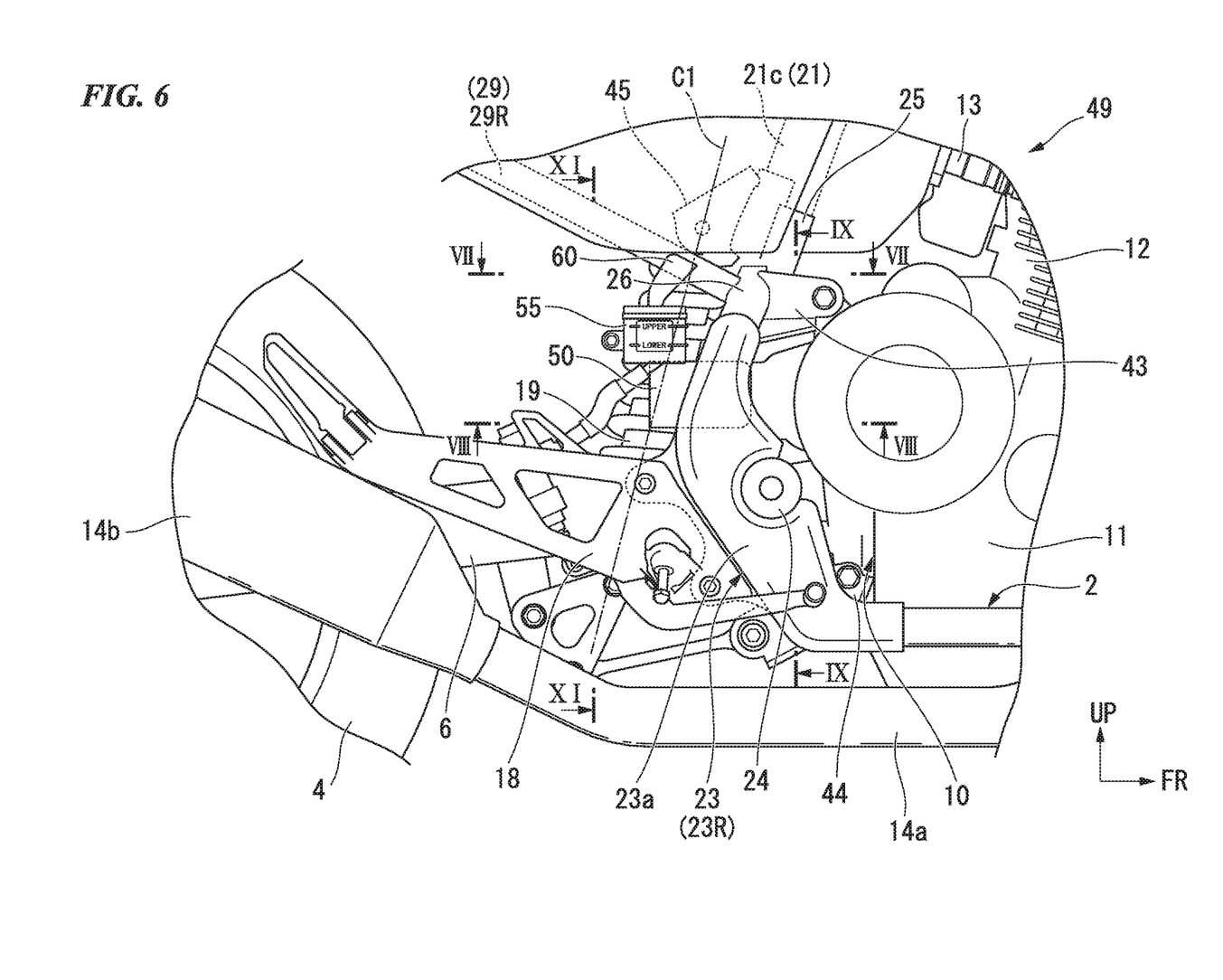
FIG. 6 is a right side view of an ABS disposition structure of the motorcycle.

As shown in FIG. 6, the upper end portion of the cushion 19 is pivotably supported by the support section 45 on the cushion on a rear side of the branch section 25. Meanwhile, the lower end portion of the cushion 19 is pivotably supported by a support section 46 under the cushion (see FIG. 9) of the swing arm 6. When seen in the side view of FIG. 6, the lower end portion of the cushion 19 is disposed at a position that overlaps the swing arm 6. When seen in the side view of FIG. 6, the lower end portion of the cushion 19 is disposed at a position that overlaps the step bracket 18. When seen in the side view of FIG. 6, most of the cushion 19 except the lower end portion is disposed to be exposed to the outside of the vehicle body frame 2.

<ABS Modulator>

The motorcycle 1 employs an anti-lock brake system (hereinafter, referred to as "ABS").

For example, calipers (not shown) of front and rear wheel brakes are connected to master cylinders (not shown) of the front and rear wheel brakes via the ABS modulator 50 (the braking force adjusting apparatus) configured to perform ABS control. The master cylinders generate a liquid pressure in a brake liquid using an operation of a brake operator such as a brake lever, a brake pedal, and so on. Further, the ABS modulator 50 is not limited to a 2-channel type corresponding to the front and rear wheel brakes, and for example, may be a single channel type corresponding to only the front wheel brake.

Figure 7:
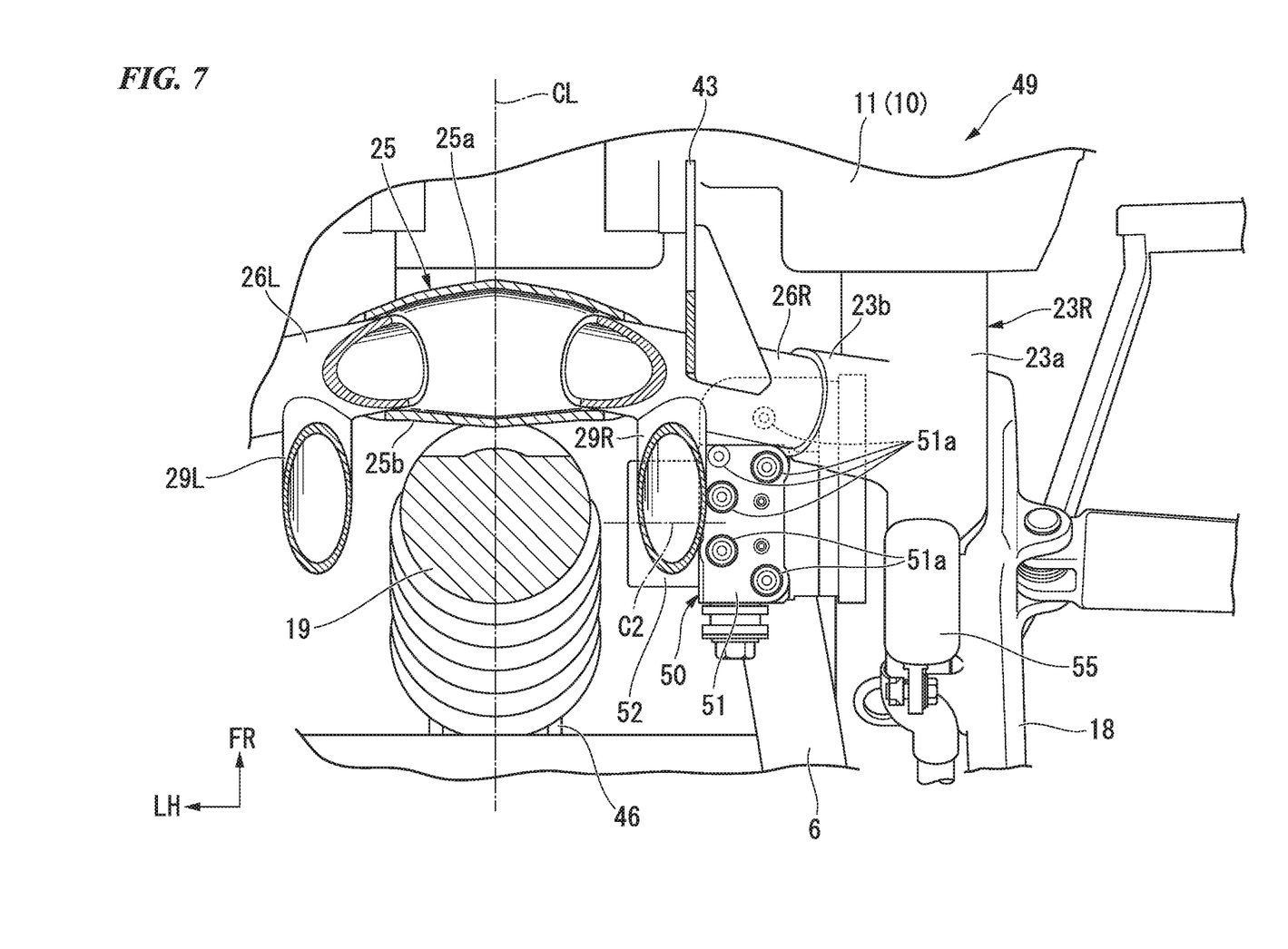
FIG. 7 is a plan view including a cross section taken along line VII-VII in FIG. 6.

For example, the ABS modulator 50 integrally includes a liquid pressure circuit section including valves, an actuator 52, and so on, that control supply and discharge of a brake liquid, and a controller configured to perform operation control of the liquid pressure circuit section (see FIG. 7). Reference character C2 in FIG. 7 designates a central axis of a driving motor (hereinafter, referred to as "a motor shaft C2") of the actuator 52. The motor shaft C2 is directed in a vehicle width direction.

When seen in the plan view of FIG. 7, the ABS modulator 50 is disposed on a right side of the vehicle body longitudinal centerline CL. When seen in the plan view of FIG. 7, the ABS modulator 50 is disposed between the cushion 19 and the right center frame 23R in the vehicle width direction. When seen in the side view of FIG. 6, a front section of the ABS modulator 50 is disposed at a position that overlaps an upper section of the right center frame 23R.

When seen in the plan view of FIG. 7, the ABS modulator 50 is longer in the forward and rearward direction than in the vehicle width direction. In the embodiment, the ABS modulator 50 (a portion except the actuator 52) has a rectangular parallelepiped shape having a long side in the forward and rearward direction.

When seen in the plan view of FIG. 7, the ABS modulator 50 is disposed outside the support pipes 29 of the seat frames 27 in the vehicle width direction. Specifically, most (a rear portion) of a pipeline connecting region 51 connected to a flare pipe or the like in the ABS modulator 50 is disposed outside the right support pipe 29R in the vehicle width direction when seen in the plan view of FIG. 7. In the embodiment, the pipeline connecting region 51 is disposed at a position accessible from a rear upper side while avoiding the right support pipe 29R. In FIG. 7, six pipeline connecting sections 51a are disposed in the pipeline connecting region 51. When seen in the plan view of FIG. 7, five pipeline connecting sections 51a among the six pipeline connecting sections 51a are exposed.

When seen in the front view of FIG. 9, the ABS modulator 50 is disposed below the connecting pipes 26 between the branch section 25 and the pivot section 24 in the upward and downward direction. When seen in the front view of FIG. 9, the ABS modulator 50 is disposed in a space surrounded by the right connecting pipe 26R, the right center frame 23R, the pivot shaft 6a (the front section of the swing arm 6) and the cushion 19.

In the embodiment, a disposition space of the ABS modulator 50 is sufficiently secured at a position when the cushion 19 swings to a foremost side. Accordingly, the disposition space of the ABS modulator 50 acts in a spreading direction even when the cushion 19 swings rearward from the initial position, in addition to when the cushion 19 is at the initial position.

<Stay>

Figure 9:
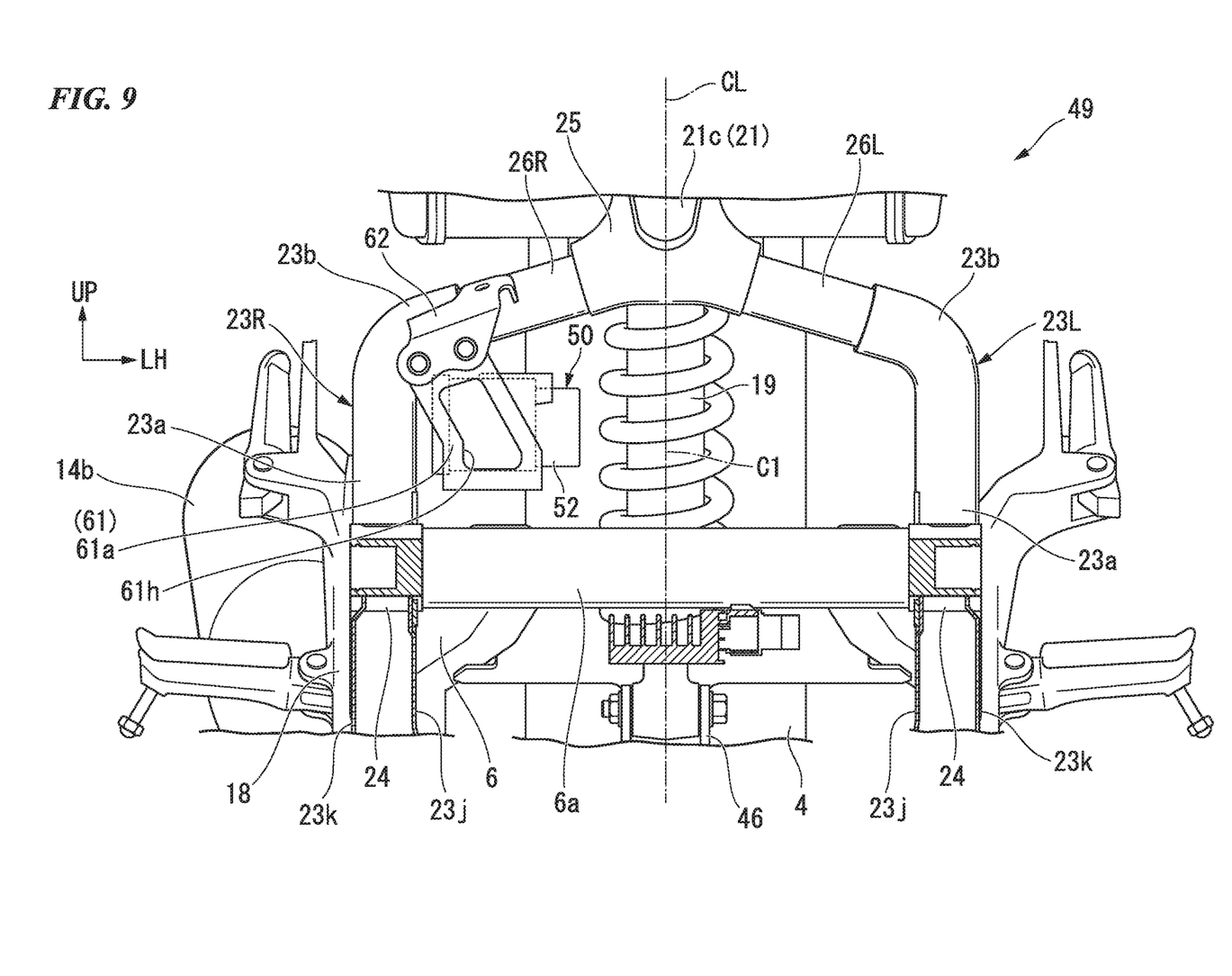
FIG. 9 is a front view including a cross section taken along line IX-IX in FIG. 6.
Figure 10:
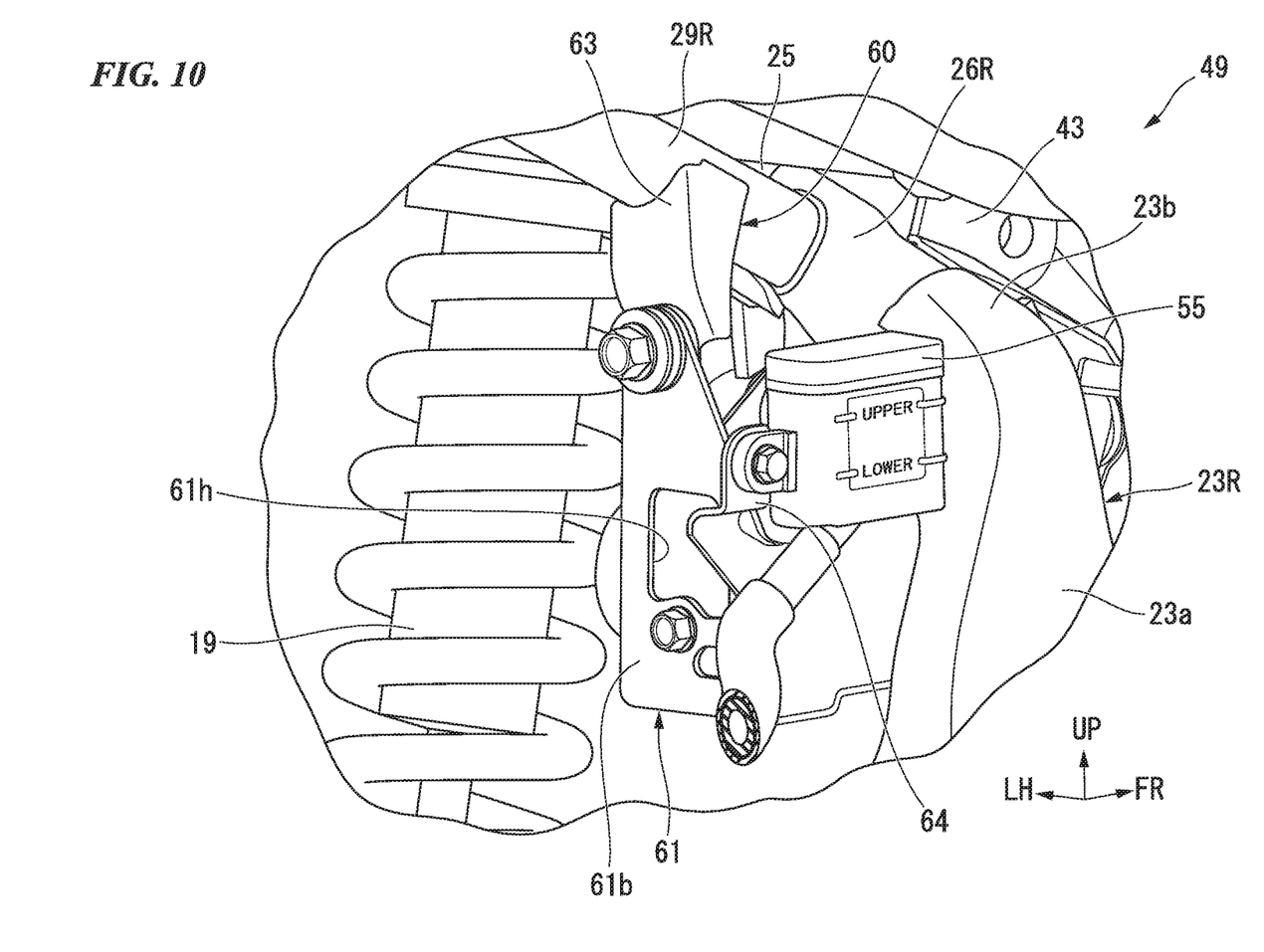
FIG. 10 is a perspective view of the ABS disposition structure.

As shown in FIG. 10, the stay 60 includes a cover member 61 configured to cover the ABS modulator 50 from front, rear and lower sides, a connecting bracket 62 (see FIG. 9) configured to connect the cover member 61 to the main frame 21, a suspension member 63 configured to suspend and support the cover member 61 on the support pipes 29, and a sub-tank support section 64 configured to support a sub-tank 55. Further, in FIG. 6, FIG. 7, and so on, illustration of some of components of the stay 60 is omitted.

The cover member 61 includes a front wall section 61a (see FIG. 9) configured to cover the ABS modulator 50 from a front side, a rear wall section 61b (see FIG. 11) configured to cover the ABS modulator 50 from a rear side, and a lower wall section 61c (see FIG. 8) connected to the front wall section 61a and the rear wall section 61b configured to cover the ABS modulator 50 from a lower side. The front wall section 61a, the rear wall section 61b and the lower wall section 61c are integrally formed of the same member.

Figure 11:
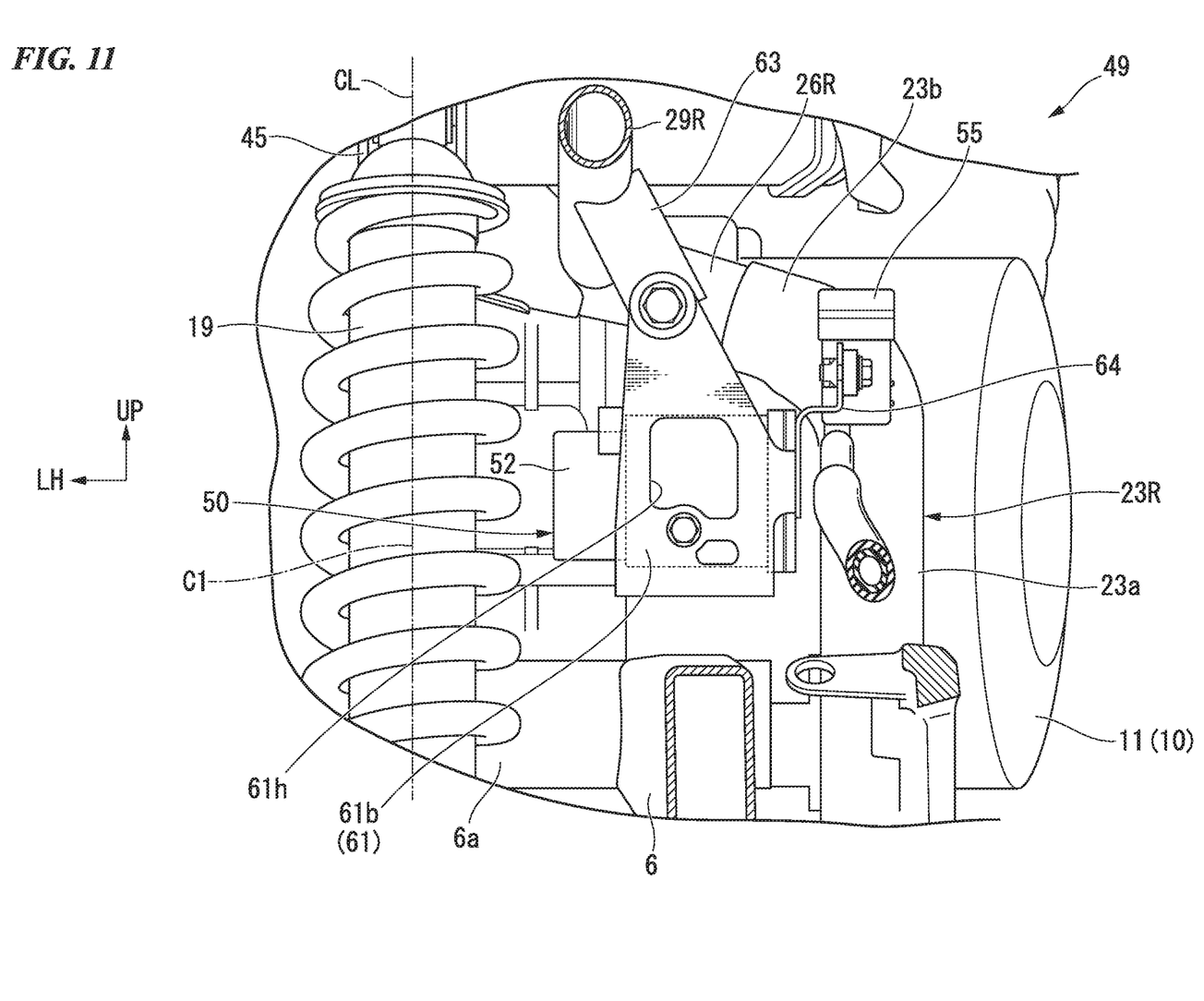
FIG. 11 is a rear view including a cross section taken along line XI-XI in FIG. 6.

In FIG. 9 to FIG. 11, reference numeral 61h designates a lightening section configured to open the front wall section 61a and the rear wall section 61b of the cover member 61 in a thickness direction. Accordingly, reduction in weight of the cover member 61 is achieved.

As shown in FIG. 9, the connecting bracket 62 extends to cross over between the upper end portion of the front wall section 61a and the main frame 21 in the upward and downward direction. For example, one end portion of the connecting bracket 62 is coupled to the main frame 21 via a connecting member (not shown). For example, the other end portion of the connecting bracket 62 is connected to an upper end portion of the front wall section 61a by a fastening member such as a bolt or the like. In the embodiment, the other end portion of the connecting bracket 62 is connected to the upper end portion of the front wall section 61a via a pair of left and right fastening members.

As shown in FIG. 10, the suspension member 63 extends upward and downward to cross over the upper end portions of the right support pipe 29R and the rear wall section 61b in the upward and downward direction. For example, the upper end portion of the suspension member 63 is coupled to the right support pipe 29R through welding. For example, a lower end portion of the suspension member 63 is coupled to the upper end portion of the rear wall section 61b via an elastic member such as a rubber bush or the like and a washer using a fastening member such as a bolt or the like.

When seen in a rear view of FIG. 11, the sub-tank 55 is disposed further inside in the vehicle width direction than an outer end of the right center frame 23R in the vehicle width direction (an outer surface of the center frame main body 23a) at behind the right center frame 23R. When seen in the rear view of FIG. 11, the sub-tank 55 is disposed closer to the upper connecting section 23b of the right center frame 23R. When seen in the rear view of FIG. 11, the sub-tank 55 is disposed at a position that is within the right center frame 23R in the vehicle width direction (in a thickness range).

When seen in the rear view of FIG. 11, the sub-tank support section 64 extends upward from a right end of the rear wall section 61b in a crank shape. The sub-tank support section 64 and the cover member 61 are integrally formed of the same member. For example, the sub-tank 55 is coupled to an upper end portion of the sub-tank support section 64 via an elastic member such as a rubber bush or the like and a washer.

As described above, the embodiment is the ABS disposition structure 49 for the motorcycle 1 including the head pipe 20, the main frame 21 extending rearward from the head pipe 20, the pair of left and right center frames 23 extending downward from the rear section of the main frame 21 and having the pivot section 24 by which the front end portion of the swing arm 6 is pivotably supported, the cushion 19 disposed at a center in the vehicle width direction, and the ABS modulator 50 configured to perform ABS control, wherein, when seen in a side view, the cushion axis C1 is disposed to be offset from the center frames 23 in the forward and rearward direction, and the ABS modulator 50 is disposed between the cushion 19 and the center frames 23 in the vehicle width direction.

According to the configuration, since the cushion axis C1 is disposed to be offset from the center frames 23 in the forward and rearward direction when seen in the side view, a sufficient space is easily secured between the cushion 19 and the center frames 23. In addition, since the ABS modulator 50 is disposed between the cushion 19 and the center frames 23 in the vehicle width direction, a space between the cushion 19 and the center frames 23 in the vehicle width direction can be effectively used. Accordingly, the ABS modulator 50 is disposed while saving space even when the cushion 19 is disposed at a center in the vehicle width direction. In addition, as the cushion axis C1 is disposed to be offset from the center frames 23 in the forward and rearward direction when seen in the side view, since a disposition space of the ABS modulator 50 acts in a spreading direction when the cushion 19 is driven (for example, swung rearward), it is suitable for disposing the ABS modulator 50 while saving space. In addition, since the ABS modulator 50 is disposed inside the center frames 23 in the vehicle width direction, it is possible to protect the ABS modulator 50 from an impact or the like from an outer side in the vehicle width direction.

In addition, in the embodiment, since the ABS modulator 50 is longer in the forward and rearward direction than in the vehicle width direction, in comparison with the case in which the ABS modulator 50 is longer in the vehicle width direction than in the forward and rearward direction, a space between the cushion 19 and the center frames 23 in the vehicle width direction is decreased. Accordingly, the ABS modulator 50 can be disposed using a small limited space.

In addition, in the embodiment, since the ABS modulator 50 is disposed outside the seat frames 27 in the vehicle width direction when seen in the plan view, in comparison with the case in which the ABS modulator 50 is disposed inside the seat frames 27 in vehicle width direction when seen in the plan view, an operator can easily access the ABS modulator 50 from above. Accordingly, a tool path or the like (a working space) of a flare pipe can be secured.

In addition, in the embodiment, since the stay 60 configured to connect the ABS modulator 50 to the vehicle body frame 2 is further provided, supporting rigidity of the ABS modulator 50 can be increased.

In addition, in the embodiment, since the stay 60 includes the cover member 61 configured to cover the ABS modulator 50 from the front, behind and below, it is possible to protect the ABS modulator 50 from external factors from the front, behind and below.

In addition, in the embodiment, as the stay 60 includes the sub-tank support section 64 configured to support the sub-tank 55, since the ABS modulator 50 and the sub-tank 55 are supported with a common stay 60, in comparison with the case in which support members for the sub-tank 55 can be installed individually and independently, the number of parts can be reduced and reduction in cost can be achieved. In addition, it is possible to easily dispose the sub-tank 55 in the vicinity of the ABS modulator 50.

In addition, in the embodiment, as the sub-tank 55 is disposed behind the center frames 23 and further inside in the vehicle width direction than the outer ends of the center frames 23 in the vehicle width direction, since the outer ends of the center frames 23 in the vehicle width direction become a portion that initially comes in contact with the ground surface (a first ground section) upon overturning or the like of the vehicle, the sub-tank 55 can be protected from an impact or the like upon overturning of the vehicle.

In addition, in the embodiment, since the branch section 25 branched off from the rear section of the single main frame 21 toward the pair of left and right center frames 23, the connecting pipes 26 configured to connect the branch section 25 and the center frames 23, and the support section 45 on the cushion installed on the rear section of the branch section 25 and configured to support the upper end portion of the cushion 19 are further provided, and the ABS modulator 50 is disposed between the branch section 25 and the pivot section 24 in the upward and downward direction and below the connecting pipes 26, the ABS modulator 50 can be disposed in a mono-backbone frame using a narrowly limited space.

In addition, while the example in which the ABS modulator 50 is disposed on the right side of the vehicle body longitudinal centerline CL has been described in the embodiment, there is no limitation thereto. For example, the ABS modulator 50 may be disposed on the left side of the vehicle body longitudinal centerline CL.

In addition, while the case in which the ABS modulator 50 has a rectangular parallelepiped shape having a long side in a forward and rearward direction has been exemplarily described in the embodiment, there is no limitation thereto. For example, the ABS modulator 50 may have a rectangular parallelepiped shape having a long side in the vehicle width direction. In addition, the ABS modulator 50 may have a cubic shape.

Further, the present invention is not limited to the embodiment, for example, all vehicles on which a driver rides on a vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to a one-front-wheeled and two-rear-wheeled vehicle) are also included. The present invention may be applied to a four-wheeled vehicle such as an automobile or the like, in addition to a motorcycle.

While the engine of the embodiment is an engine having a cylinder protruding forward and upward (a forward tilting cylinder), the engine may be an engine including a cylinder protruding rearward and upward (a rearward tilting cylinder). In addition, the engine is not limited to a so-called transverse engine in which a crankshaft is disposed in a vehicle width direction, and may be a so-called vertical engine in which a crankshaft is disposed in a vehicle forward and rearward direction, and also in this case, a cylinder may be variously disposed. Further, a power unit may include an electric motor as a drive source.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An anti-lock braking system disposition structure of a saddle riding vehicle comprising:
    a head pipe;
    a main frame extending rearward from the head pipe;
    a pair of left and right center frames extending downward from a rear section of the main frame and having a pivot section by which a front end portion of a swing arm of the saddle riding vehicle is pivotably supported;
    a cushion disposed at a center in a vehicle width direction;
    an anti-lock braking system modulator configured to perform anti-lock braking system control, and
    a stay configured to connect the anti-lock braking system modulator to a vehicle body frame of the saddle riding vehicle,
    wherein, when seen in a side view, a central axis of the cushion is disposed to be offset from the center frame in a forward and rearward direction,
    the anti-lock braking system modulator is disposed between the cushion and the center frame in the vehicle width direction, and
    the stay comprises a sub-tank support section configured to support a sub-tank of the saddle riding vehicle.

2. The anti-lock braking system disposition structure of the saddle riding vehicle according to claim 1, wherein the anti-lock braking system modulator is longer in the forward and rearward direction than in the vehicle width direction.

3. The anti-lock braking system disposition structure of the saddle riding vehicle according to claim 1, wherein, when seen in a plan view, the anti-lock braking system modulator is disposed outside a seat frame of the saddle riding vehicle in the vehicle width direction.

4. The anti-lock braking system disposition structure of the saddle riding vehicle according to claim 1, wherein the stay comprises a cover member configured to cover the anti-lock braking system modulator from a front, behind and below.

5. The anti-lock braking system disposition structure of the saddle riding vehicle according to claim 1, wherein the sub-tank is disposed behind the center frame and further inside in the vehicle width direction than an outer end of the center frame in the vehicle width direction.

6. The anti-lock braking system disposition structure of the saddle riding vehicle according to claim 1, further comprising:
    a branch section branched off from a rear section of the single main frame toward the pair of left and right center frames;
    a connecting pipe configured to connect the branch section and the center frame; and
    a support section on a cushion installed on a rear section of the branch section and configured to support an upper end portion of the cushion,
    wherein the anti-lock braking system modulator is disposed below the connecting pipe in between the branch section and the pivot section in the upward and downward direction.

* * * * *